United States Patent
Sasaki et al.

(10) Patent No.: US 6,841,257 B2
(45) Date of Patent: Jan. 11, 2005

(54) ADHESIVE COMPOSITIONS AND CONSTRUCTIONS WITH OUTSTANDING CUTTING PERFORMANCE

(75) Inventors: Yukihiko Sasaki, Claremont, CA (US); Jesse C. Ercillo, Covina, CA (US); Le Hoa Hong, Monterey Park, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/463,829

(22) Filed: Jun. 16, 2003

(65) Prior Publication Data

US 2004/0058171 A1 Mar. 25, 2004

Related U.S. Application Data

(62) Division of application No. 09/591,768, filed on Jun. 12, 2000, now Pat. No. 6,579,941.

(51) Int. Cl.[7] .................... B32B 27/32; B32B 33/00
(52) U.S. Cl. .................. 428/447; 428/448; 428/451; 428/41.4
(58) Field of Search ................ 428/447, 448, 428/451, 41.3

(56) References Cited

U.S. PATENT DOCUMENTS

| | | | |
|---|---|---|---|
| 3,464,842 A | 9/1969 | Jackstadt | |
| 3,577,398 A | 5/1971 | Pace et al. | |
| 3,581,281 A | 5/1971 | Martin et al. | |
| 3,692,756 A | 9/1972 | St. Cyr | |
| 4,151,319 A * | 4/1979 | Sackoff et al. | 428/41.4 |
| 4,260,659 A | 4/1981 | Gobran | |
| 4,335,171 A | 6/1982 | Zenk | |
| 4,346,189 A | 8/1982 | Laurent | |
| 4,374,883 A | 2/1983 | Winslow | |
| 4,543,139 A | 9/1985 | Freedman et al. | |
| 4,548,845 A | 10/1985 | Parsons et al. | |
| 4,820,746 A | 4/1989 | Rice et al. | |
| 4,894,259 A | 1/1990 | Kuller | |
| 5,011,867 A | 4/1991 | Mallya et al. | |
| 5,093,406 A | 3/1992 | Lossner et al. | |
| 5,154,974 A | 10/1992 | Norman et al. | |
| 5,164,444 A | 11/1992 | Bernard | |
| 5,232,958 A | 8/1993 | Mallya et al. | |
| 5,252,662 A | 10/1993 | Su et al. | |
| 5,290,842 A * | 3/1994 | Sasaki et al. | 524/271 |
| 5,322,876 A | 6/1994 | Sasaki et al. | |
| 5,558,913 A | 9/1996 | Sasaki et al. | |
| 5,705,551 A | 1/1998 | Sasaki et al. | |
| 5,718,958 A | 2/1998 | Scholz et al. | |
| 5,728,430 A | 3/1998 | Sartor et al. | |
| 5,817,426 A | 10/1998 | Spada et al. | |
| 5,827,609 A | 10/1998 | Ercillo et al. | |
| 5,882,775 A * | 3/1999 | Matsui et al. | 428/213 |
| 5,939,479 A | 8/1999 | Reaves et al. | |
| 6,072,012 A | 6/2000 | Juen et al. | |
| 6,312,777 B1 | 11/2001 | Smith | |
| 6,579,941 B1 * | 6/2003 | Sasaki et al. | 525/100 |

FOREIGN PATENT DOCUMENTS

| | | |
|---|---|---|
| EP | 0 519 278 B1 | 12/1992 |
| EP | 0 781 198 | 7/1997 |
| EP | 0 781 311 | 7/1997 |
| EP | 0 793 542 | 9/1997 |
| EP | 0 887 441 | 12/1997 |
| WO | WO 96/08319 | 3/1996 |
| WO | WO 96/08320 | 3/1996 |
| WO | WO 96/08367 | 3/1996 |
| WO | WO 96/08369 | 3/1996 |
| WO | WO 96/08539 | 3/1996 |
| WO | WO 97/33748 | 9/1997 |
| WO | WO 00/17285 A1 | 3/2000 |
| WO | WO 01/96488 A2 | 12/2001 |

OTHER PUBLICATIONS

"Silwet Surfactants" Product Brochure; ©1997 Witco Corporation; 22 sheets.

* cited by examiner

Primary Examiner—Margaret G. Moore
(74) Attorney, Agent, or Firm—Christie, Parker & Hale, LLP

(57) ABSTRACT

An adhesive construction, characterized by excellent converting and adhesive performance, comprises a facestock, a face-side adhesive (FSA) in contact with a first surface of the facestock, and a liner-side adhesive (LSA) in contact with the FSA. The FSA is compounded with an organopolysiloxane or modified organopolysiloxane. Single layer constructions, and multilayer constructions comprising more than two adhesive layers, and unique adhesive compositions, are also provided. The constructions can be run in high-speed converting presses and adhere well to a variety of substrates.

28 Claims, 1 Drawing Sheet

ADHESIVE COMPOSITIONS AND CONSTRUCTIONS WITH OUTSTANDING CUTTING PERFORMANCE

CROSS REFERENCE TO RELATED APPLICATIONS

This patent application is a divisional application of U.S. application Ser. No. 09/591,768 filed Jun. 12, 2000 now U.S. Pat. No. 6,579,941.

FIELD OF THE INVENTION

The present invention is directed to adhesive compositions and constructions characterized by excellent adhesion to a variety of substrates and the ability to be converted at high speeds in high-speed converting presses.

BACKGROUND OF THE INVENTION

Adhesive tapes and labels having a laminate construction are well known. In a typical construction, one or more layers of adhesive are coated on, or otherwise applied to, a release liner, and then laminated to a facestock, such as paper, polymeric film, or other flexible material. Alternatively, the adhesive is coated directly on the facestock, and the coated facestock is laminated to a release liner. The adhesive may be a pressure-sensitive adhesive (PSA), and may be rubber-based or acrylic-based. Rubber-based hot melt PSAs (HMPSAs) typically contain one or more natural or synthetic elastomers, tackified with one or more petroleum resins, rosins, or rosin derivatives, and/or other ingredients, such as plasticizers, which improve the tack of the adhesive.

PSA tape and label constructions are usually manufactured as a continuous rolls in various widths, and then passed through apparatus that converts the adhesive laminate into smaller rolls or sheets, and ultimately, individual labels and tapes. The processes involved in converting include printing, slitting, die-cutting, and matrix-stripping to leave labels on a release liner, butt-cutting of labels to the release liner, marginal hole punching, perforating, fan folding, guillotining and the like. Die-cutting involves cutting of the laminate to the surface of the release liner. Hole punching, perforating and guillotining involve cutting clean through the label laminate.

The cost of converting a laminate into a finished product is a function of the speed and efficiency at which the various processing operations occur. The faster the PSA construction can be converted, the lower the cost of the finished product. Modern converting presses are designed to be operated at speeds as high as 500 or even 1000 feet per minute, and it is desirable to manufacture PSA constrictions that can be converted at such high speeds. While the nature of all layers of the laminate can impact the cost of convertibility, the adhesive layer typically has been the greatest limiting factor in ease of convertibility. This is due to the viscoelastic nature of the adhesive, which hampers precise and clean penetration of a die in die-cutting operations and promotes adherence to die-cutting blades in shearing operations. Stringiness of the adhesive also impacts matrix-stripping operations, which follow die-cutting operations.

During guillotining or a similar shearing step, in which a plurality of label laminates are cut with a knife blade, the adhesive has a tendency to flow, either because of its general liquidity, or as a combination of that general liquidity and the exertion of pressure by the knife blade, alone or in conjunction with pressure associated with the plurality of sheets held during operation. As a result of adhesive flow during a guillotining operation, the knife blade tends to become coated with a layer of adhesive. The coating tends to reduce the efficacy of further shearing cuts, and also can deposit and smear adhesive on the edge surfaces of the articles being cut.

Adding a lubricant, such as silicone oil, wax, and/or surfactant to the PSA can reduce adhesive build-up on knife blades during shearing operations. Representative of this approach are U.S. Pat. No. 4,151,319 (Sackoff et al.), U.S. Pat. No. 4,346,189 (Laurent), U.S. Pat. No. 4,548,845 (Parsons), U.S. Pat. No. 5,154,974 (Norman, et al.) U.S. Pat. No. 5,322,876 (Sasaki, et al.), U.S. Pat. No. 5,705,551 (Sasaki, et al.), and U.S. Pat. No. 5,939,479 (Reaves et al.). Unfortunately, most of the additives that have been tried before, although effective at reducing adhesive build-up on cutting blades, have the undesirable property of reducing the adhesivity of the PSA to which they are added. A real need exists for an improved PSA construction that exhibits both excellent adhesive performance and outstanding converting properties, especially the ability to be cleanly sheared in high-speed cutting operations.

SUMMARY OF THE INVENTION

In one aspect of the invention, an adhesive construction characterized by excellent converting performance and adhesion to a variety of substrates is provided. An adhesive laminate, preferably comprised of two or more adhesive layers, for example, a faceside adhesive (FSA) and a liner side adhesive (LSA), is coated on or laminated to a facestock. At least one adhesive layer, for example, the FSA, is compounded with a cutting aid, e.g., an organopolysiloxane or a modified organopolysiloxane. Preferably, at least one adhesive layer, for example, the LSA, is a functional PSA, i.e., an adhesive which, in dry form, is aggressively and permanently tacky at room temperature and firmly adheres to a variety of substrates upon mere contact, with no more than finger or hand pressure.

In an other aspect of the invention, an adhesive construction is comprised of a single PSA layer coated on or laminated to a facestock, the PSA being compounded with a polyalkylene oxide-modified organopolysiloxane or an ultrahigh molecular weight organopolysiloxane.

In still another aspect of the invention, improved adhesive compositions are provided. One such composition comprises an adhesive—preferably a PSA—compounded with an ultrahigh molecular weight organopolystyrene. Another adhesive composition comprises a tackified blend of elastomers compounded with an organopolysiloxane—such as an ultrahigh molecular weight organopolysiloxane dispersed in polystyrene—or a modified organopolysiloxane, such as a polyalkylene oxide-modified organopolysiloxane.

BRIEF DESCRIPTION OF THE DRAWINGS

These and other features and advantages of the invention will be understood more clearly when considered in view of the accompanying text and drawings, wherein.

DETAILED DESCRIPTION OF THE INVENTION

Figure 1:
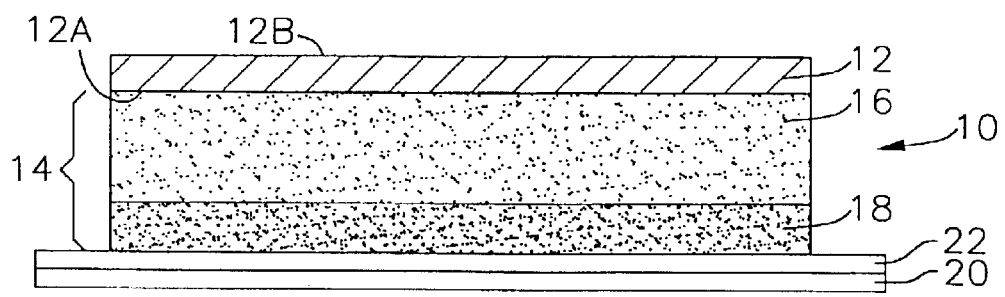
FIG. 1 is a schematic, cross-sectional illustration of one embodiment of a multilayer adhesive construction according to the invention, showing a facestock, adhesive laminate with two adhesive layers, and a release liner.

A first embodiment of the invention is schematically illustrated in FIG. 1, which is a cross-sectional view of a multilayer adhesive label, i.e., a label laminate construction. In this embodiment, the construction 10 comprises a facestock 12, having a first (or inner) surface 12a and a second (or outer) surface 12b, and adhered thereto an adhesive laminate 14 formed of at least two layers: a face side adhesive (FSA) layer 16 and a liner side adhesive (LSA) layer 18. The FSA layer 16 contains, as an essential ingredient, a siloxane-type cutting aid, e.g., an organopolysiloxane or modified organopolysiloxane, nonlimiting examples of which are described below. The LSA is a functional PSA. It is preferred to protect the adhesive laminate until use by a release liner 20 having a release surface 22. Alternatively, the release liner 20 is omitted, and the outer surface 12b of the facestock is coated or otherwise provided with a release surface 22, in which case the construction is referred to as a "linerless" construction or tape. The adhesive laminate 14 has two adhesive layers, as shown, or multiple adhesive layers. The thickness of each layer of the construction in FIG. 1 is exaggerated for clarity, and the relative thicknesses of the layers are not necessarily to scale.

The facestock 12 can be any flexible material commonly used as the facestock in tapes and labels. Nonlimiting examples include paper, such as high gloss, semi-gloss, and litho, each used in multi-color printing applications, and electronic data processing (EDP) paper, used in typewriter and ink-jet printing applications; polyesters, such as polyethylene terephthlate (PET); polyolefins, such as polypropylene, ethylene-propylene copolymers, polyethylene; and other materials. The first, or inner, surface 12a of the facestock 12 (sometimes called an undersurface) is optionally coated with a barrier layer (not shown), other than the barrier created by the adhesive laminate, to prevent migration of constituents from the adhesive laminate 14 into the facestock 12. There may also be included, or alternatively provided, a tie or primer layer (not shown) to enhance adhesion of the adhesive laminate 14 to the facestock 12. In linerless constructions, the second, or outer, surface of the facestock is coated with a release material, such as a silicone, e.g., polydimethylsiloxane, or a non-silicone, e.g., Quilon™, carbonate or other material.

The adhesive laminate 14 is comprised of at least two distinct adhesive layers 16 and 18. A face side adhesive (FSA) layer 16 is comprised of an adhesive, which is optionally a PSA. The FSA is compounded with a polyalkylene oxide-modified organopolysiloxane, as described below. The adhesive layer furthest from the facestock 12, and adjacent to the FSA layer 16, is a liner side adhesive (LSA) layer 18, which is a PSA.

In a preferred embodiment, the FSA layer 16 of the adhesive laminate 14 is a tackified blend of at least two immiscible elastomers, as described, e.g., in U.S. Pat. No. 5,290,842 (Sasaki et al.), which is assigned to Avery Dennison Corporation and incorporated by reference herein. A first elastomer comprises a first diene-containing elastomer characterized by a first glass transition temperature, $T_{g1}$. A second elastomer in the FSA layer 16 comprises a second diene-containing elastomer characterized by a second glass transition temperature $T_{g2}$, where $T_{g1} < T_{g2}$. Similarly, in a preferred embodiment, the LSA layer 18 of the adhesive laminate 14 is a tackified blend of at least two immiscible elastomers.

The elastomers used in the present invention are natural or synthetic elastomeric polymers, including, for example, AB, ABA, and "multiarmed" $(AB)_x$ block copolymers, where for example, A is a polymerized segment or "block" comprising at least one monoalkenylarene, preferably styrene, alpha-methyl styrene, vinyl toluene, and the like; B is an elastomeric, conjugated polybutadiene or polyisoprene block; and x has a value of 3 or more. Preferred first diene-containing elastomers are butadiene-based polymers, especially styrene-butadiene-styrene (SBS) and styrene-butadiene (SB) block copolymers, where "S" denotes a polymerized segment or "block" of styrene monomers, and "B" denotes a polymerized segment or "block of butadiene monomers. Other useful butadiene-based elastomers include multiarmed $(SB)_x$ block copolymers, where x is at least 3. Alternatively, the first elastomer can be polybutadiene homopolymer. Polybutadiene blocks have a $T_g$ of about −80° C. Polystyrene blocks have a $T_g$ of about 93° C. Preferred second diene-containing elastomers are isoprene-based polymers, especially styrene-isoprene-styrene (SIS) block copolymers, styrene-isoprene (SI) block copolymers, and multiarmed styrene-isoprene $(SI)_x$ block copolymers. (where x is at least 3), and the like, where "I" denotes a polymerized segment or "block" of isoprene monomers. Other useful isoprene-based elastomers include radial block copolymers having a SEBS backbone (where "E" and "B" are, respectively, polymerized blocks of ethylene and butylene) and I and/or SI arms. Natural rubber (polyisoprene), synthetic polyisoprene, and/or random copolymers that are capable of forming a discontinuous phase also can be used. Polyisoprene blocks have a $T_g$ of about −54° C.

Natural and synthetic elastomers containing polybutadiene segments and polyisoprene segments are not generally miscible with each other, except at weight ratios skewed heavily in favor of one of the two elastomers. Immiscible blends of elastomeric polymers based on polybutadiene and polyisoprene, however, can be prepared. In general, homopolymers are more difficult to mix than block copolymers.

Figure 2:
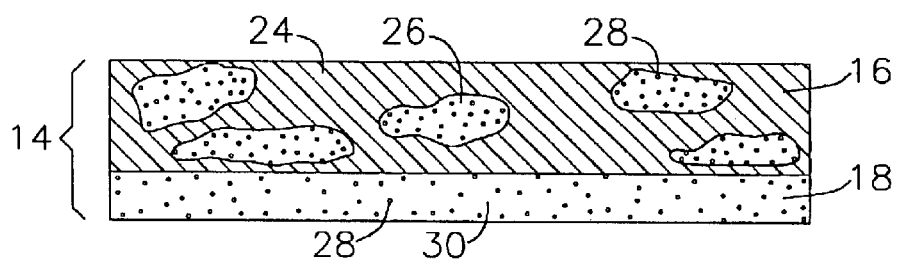
FIG. 2 is a schematic, cross-sectional illustration of one embodiment of a two-layer adhesive laminate.

Referring now to FIG. 2, one embodiment of a two-layer adhesive laminate 14 is shown. The adhesive laminate has a FSA layer 16 and a LSA layer 18. The FSA layer is formed of a tackified blend of two immiscible elastomers, which are provided in relative proportions such that the first elastomer forms a continuous phase 24 and the second elastomer forms a discontinuous phase 26, contained within and distributed throughout the continuous elastomeric phase. The immiscible blend of elastomers is tackified with at least one tackifier 28 that is preferentially soluble in the discontinuous elastomeric phase 26. A cutting aid (not shown) is dispersed throughout some or all of the FSA. A preferred FSA layer 16 has a continuous phase 24 of a butadiene-containing block copolymer, e.g., SBS and/or SB block copolymers. Distributed throughout the continuous phase is a discernible, discontinuous phase 26 of polyisoprene or, more preferably, an isoprene-containing block copolymer, e.g., SIS and/or SI block copolymers.

Where immiscible blends of butadiene block copolymers and isoprene block copolymers are used to form the FSA layer 16, the elastomers are blended together at a weight ratio of butadiene-based elastomers to isoprene-based elastomers of from about 0.5:1 to 5:1, preferably from about 1:1 to 5:1, more preferably from about 1.5:1 to 2:1. A particularly preferred weight ratio is about 1.5:1 parts by weight of butadiene-based to isoprene-based elastomers.

Commercially available isoprene-based elastomers useful in the practice of the present invention include linear SIS and/or SI block copolymers such as Quintac 3433 and Quintac 3421, available from Nippon Zeon Company, Ltd. (U.S. sales office—Louisville, Ky.); Vector DPX 559, Vector 4111 and Vector 4113 available from Dexco, a partnership of Exxon Chemical Co. (Houston, Tex.) and Dow Chemical Co. (Midland Mich.); and Kraton® rubbers, such as Kraton 604x, Kraton D-1107, Kraton D-1112, Kraton D-1117, and Kraton D-1113, available from Shell Chemical Co. (Houston, Tex.). Kraton D-1107 is a predominantly SIS elastomer containing about 15% by weight SI block copolymers. Kraton D-1320x is an example of a commercially available $(SI)_xI_y$ multiarmed block copolymer in which some of the arms are polyisoprene blocks. Commercially available butadiene-based elastomers include SBS and/or SB rubbers, such as Kraton D-1101, D-1102 and D-1118X, from Shell Chemical Co.; Solprene 1205, a SB block copolymer available from Housemex, Inc. (Houston, Tex.); and Kraton TKG-101 (sometimes called "Tacky G"), a radial block copolymer having an SEBS backbone (E=ethylene block; B=butylene block) and I and/or SI arms.

Immiscibility of the first and second elastomers is indicated by a hazy appearance of the first adhesive layer, as measured by ASTM D 1003, and occurs at a weight ratio of first elastomer to second elastomer greater than or equal to about 0.5:1.0, more typically greater than about 1:1. The distinct phases of the first and second elastomers can be observed by transmission electron microscopy (TEM).

It will be appreciated that, when styrene-containing block copolymers (such as SBS, SIS, SB and SI) are employed as elastomers in the adhesive layers described herein, the polymerized styrenic segments will form their own discrete phase, in addition to the phase(s) formed by the other elastomer(s). The styrenic phase appears in TEM photomicrographs as a vast plurality of discrete, globular domains dispersed throughout the adhesive layer. However, the size of the dispersed styrenic domains is quite small—less than 500 nm—and, therefore, the presence of discrete styrenic domains in an otherwise continuous phase of one elastomer or a miscible blend of elastomers does not cause the overall adhesive layer to be hazy in appearance. The small styrenic domains do not refract visible wavelengths of light to any appreciable degree. Accordingly, in describing the present invention, the terms "continuous phase" and "discontinuous phase" are used to describe and refer to the non-styrenic phases of the various elastomeric systems present in the FSA and LSA layers.

Referring again to FIG. 2, the second elastomer of the FSA layer is tackified with a tackifying system (described below) comprising at least one tackifier 28 and, optionally, at least one plasticizer (not shown), with both the tackifier(s) and plasticizer(s) being more soluble in the second elastomer than in the first elastomer. Such preferential solubility causes the tackifier(s) and plasticizer(s) to remain in the discontinuous phase 26 of the FSA layer 16, and inhibits migration of the tackifying system into the second adhesive layer 18 of the adhesive laminate 14.

The second layer of the adhesive laminate 14 is a LSA layer 18, which is compositionally different from the FSA layer 16 and comprises one or more tackified elastomers, which may have two glass transition temperatures and provides either single phase or a continuous and discontinuous phase. A tackifying system comprising one or more tackifiers and, optionally, one or more plasticizers, is also present. In a preferred embodiment, where the FSA layer 16 has a butadiene-based continuous phase and an isoprene-based discontinuous phase, the LSA layer 18 is composed of either tackified polyisoprene or, more preferably, a tackified mixture of butadiene-based and isoprene-based elastomers, where the elastomers are provided in relative proportions such that the resulting mixture forms a single discernible phase 30 of butadiene-containing and isoprene-containing elastomers. Thus, the weight ratio of the butadiene-containing to isoprene-containing elastomers is sufficiently low, i.e., less than 0.5:1, more preferably less than about 0.4:1, that the elastomers are not immiscible, as indicated by a haze measurement and/or TEM.

Because the tackifiers 28 are preferentially soluble in the isoprene-containing elastomers in the adhesive laminate, they are primarily confined to the discontinuous phase 26 of the FSA layer 16 and the single phase 30 of the LSA layer 18, and do not migrate substantially between the layers.

Figure 3:
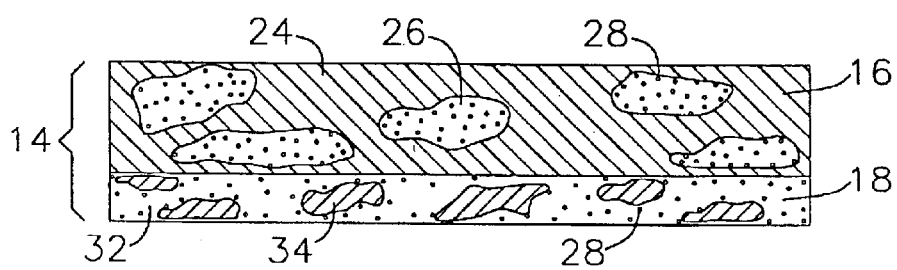
FIG. 3 is a schematic, cross-sectional illustration of another embodiment of a two-layer adhesive laminate.

In an alternate embodiment shown in FIG. 3, an adhesive laminate is formed of a FSA layer 16 and a LSA layer 18. The FSA layer is as described above and has, for example, a continuous phase 24 of at least one butadiene-based elastomer and a discontinuous phase 26 of at least one isoprene-based elastomer. One or more tackifiers are present and preferentially soluble in the discontinuous phase. The LSA layer 18 is also composed of a tackified blend of at least two immiscible elastomers, which form, respectively, a continuous phase 32 and a discontinuous phase 34. Where the FSA layer has a continuous butadiene-based phase and a discontinuous isoprene-based phase, it is preferred that the LSA layer 18 has a continuous isoprene-based phase and a discontinuous butadiene-based phase, with one or more tackifiers 28 present and preferentially soluble in the isoprene-based phases. As in the embodiment shown in FIG. 4, migration of the tackifiers from isoprene-based to butadiene-based phases is inhibited.

With both embodiments, the beneficial properties of the layers 16 and 18 will be preserved with time and will not change in consequence of tackifier migration. The inhibition of tackifier migration also should result in reduced swelling of the facestock, in those embodiments where a polymeric facestock is used.

Tackifiers and other additives that can be combined with isoprene-based and butadiene-based elastomeric compositions vary in their compatibility with the butadiene or isoprene portions of the elastomers. While preferentially soluble in either the isoprene or the butadiene segments, normally there is some degree of compatibility with both components. Additives that tend to increase or have no impact on the glass transition temperature of the elastomer(s) are regarded in the art as tackifiers, while those tending to lower glass transition temperature are known as plasticizers. The tackifiers and other additives may also be preferentially soluble in the polystyrene portion of the elastomer, and may act as a reinforcing agent.

The tackifying systems used in the present invention comprise one or more tackifiers that increase glass transition temperature, and optionally, one or more plasticizers. For FSA layer 16, the tackifier(s) and plasticizer(s) are preferentially soluble in the discontinuous phase formed by the high $T_g$ elastomer(s) which, in a preferred embodiment, is an isoprene-based elastomer or elastomers. Tackifiers that are partially soluble in the continuous phase may also be used. For LSA layer 18, the tackifier(s) and plasticizer(s) are preferentially soluble in the continuous isoprene-based elastomeric phase (in two-phase embodiments) or are dispersed throughout the LSA layer (in single-phase embodiments).

Tackifiers useful in the practice of the present invention include normally solid tackifiers (solid at or near room temperature), normally liquid tackifiers (liquid at or near room temperature) and intermediate softening point resins (ISPRs). One or more plasticizers, such as a plasticizer oil, also may be included. Normally solid tackifiers, when prilled, tend to remain prilled, even under hot, humid conditions. They tend to have softening points greater than about 80° C., and are solid at or near room temperature (20–25° C.). Normally liquid tackifiers are liquids at room temperature, with softening points less than about 20° C. ISPRs are hydrocarbon resins that are semi-solid materials at room temperature, with softening points ranging from about 35–60° C., more preferably about 50 to 60° C.

The tackifier(s) used in the FSA layer either increase or leave unchanged the glass transition temperature of the discontinuous elastomeric phase (e.g., the isoprene-based phase), while the plasticizers, if present, tend to lower the glass transition temperature of the discontinuous elastomeric phase. For the FSA layer, the tackifying system is preferentially soluble in the discontinuous phase and has the net effect of amplifying the difference in glass transition temperatures of the continuous and discontinuous elastomeric phases, and also amplifies the tangent delta value of the discontinuous elastomeric phase. The significance of preferential tackifier stability and the effect on $T_g$ shifts, tangent delta amplification, and tackifier migration is described in International Application No. PCT/US99/22101, filed Sep. 23, 1999 (assigned to Avery Dennison Corporation), which is incorporated by reference herein.

Preferred tackifiers that are preferentially soluble in isoprene-based elastomers are obtained by polymerization of a stream of aliphatic petroleum derivatives in the form of dienes and mono-olefins containing 5 or 6 carbon atoms, generally in accordance with the teachings of U.S. Pat. No. 3,577,398 to Pace and U.S. Pat. No. 3,692,756 to St. Cyr, both incorporated herein by reference. The resulting hydrocarbons range from materials that are normally liquid at room temperature to materials that are normally solid at room temperature, and typically contain 40% or more by weight polymerized dienes. The dienes are typically piperylene and/or isoprene. Nonlimiting examples include the Wingtack® family of resins sold by the Chemical Division of Goodyear Tire and Rubber Company (Akron, Ohio). Wingtack® resins have a numerical designation that corresponds to the softening point of the resin, i.e., Wingtack 95 is normally a solid resin at room temperature, with a softening point of about 95° C., and Wingtack 10 is normally a-liquid resin at room temperature, with a softening point of about 10° C.

Other normally solid tackifiers include Escorez 1304 and Escorez 1310-LC, manufactured by Exxon Chemical Co. (Houston, Tex.), and Piccotac 95, manufactured by Hercules Inc. (Wilmington, Del.).

Nonlimiting examples of ISPRs include Hercotac 2010 (formerly identified as RES-A-2514), from Hercules Inc., and ECR-185, a developmental tackifier from Exxon Chemical Co. Hercotac 2010 is a modified $C_5$-type petroleum resin with approximately 5 to 25% aromatic content (primarily $C_8$ and/or $C_9$ compounds), made by copolymerizing one or more $C_5$ mono-olefins and/or diolefins with one or more $C_8$ or $C_9$ monoalkenyl aromatic hydrocarbons. Nonlimiting examples of $C_5$ mono-olefins and diolefins are isoprene, 2-methyl-1-butene, 2-methyl-2-butene, cyclopentene, 1-pentene, cis- and trans-2-pentene, cyclopentadiene, and cis- and trans-1,3-pentadiene. Nonlimiting examples of $C_8$ and $C_9$ monoalkenyl aromatic compounds are styrene, methyl styrene, and indene.

Both Hercotac 2010 and ECR-185 have softening points intermediate that of normally liquid resins and normally solid resins, and are semi-solid at ambient temperature. At the low deformation frequencies encountered in bonding processes (i.e., application of an adhesive construction to a substrate), ISPRs flow, thereby imparting good wettability to the adhesive system. But unlike conventional liquid resins or plasticizing oils, ISPRs behave more like solid resins at high deformation frequencies, increasing the storage modulus of the adhesive system and enhancing die-cutting and converting performance. ISPRs appear to compatibilize the two immiscible elastomers, which then tend to exhibit a single glass transition temperature peak in a dynamic mechanical spectrum (DMS). However, in some embodiments, two glass transition temperatures may be observed. Adhesive formulations incorporating ISPRs have lower percent volatiles than those formulated with a liquid resin and plasticizing oil, and can be applied over a broader range of temperatures than similar systems formulated with normally liquid and/or normally solid resins and plasticizing oils. In addition, heat-aging studies indicate that the ISPR-based HMPSAs have less bleed and staining tendencies than HMPSAs formulated with liquid tackifiers and plasticizers.

Other compositions that serve a tackifier function for isoprene-based elastomers include hydrogenated aromatic resins in which a very substantial portion, if not all, of the benzene rings are converted to cyclohexane rings (for example, the Regalrez family of resins manufactured by Hercules, such as Regalrez 1018, 1033, 1065, 1078 and 1126, and Regalite R-100, the Arkon family of resins from Arakawa Chemical (U.S. sales office—Chicago, Ill.), such as Arkon P-85, P-100, P-115 and P-125) and hydrogenated polycyclic resins (typically dicyclopentadiene resins), such as Escorez 5300, 5320, 5340 and 5380 manufactured by Exxon Chemical Co.

There can be also added rosins, rosin esters, polyterpenes and other tackifiers that are compatible to some degree with the polyisoprene and polybutadiene phases. Other additives include plasticizer oils, such as Shellflex 371, manufactured by Shell Chemical Co., and Kaydol mineral oil, manufactured by Witco Chemical Corp. which are soluble in both the polyisoprene and polybutadiene phases.

In one embodiment, the tackifying system is present in an amount, based on the total weight of tackifying system and elastomers within a given adhesive layer, of from about 50% to 80% by weight, preferably from 50% to about 70% by weight, more preferably from about 60% to 70% by weight. The presently preferred ratio is about 38% by weight elastomer(s) and about 62% by weight tackifying system, the latter preferably consisting of a normally solid tackifier, such as Wingtack 95 or Escorez 1310 LC. Polystyrene reinforcing additives also can be present.

The tackified elastomers in the FSA are further compounded with a cutting aid, which imparts the multilayer construction with greatly improved converting properties. In one embodiment, the cutting aid is one or more polyalkylene oxide-modified organopolysiloxane. Most preferred are Silwet® surfactants, sold by Witco Corporation's Organosilicones Group (Greenwich, Conn.). Silwet® surfactants are of two types: linear and branched. The linear compounds are linear polydimethylsiloxanes to which polyethers have been grafted through a hydrosilation reaction; they have the following general formula (I):

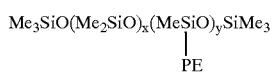

$$Me_3SiO(Me_2SiO)_x(MeSiO)_ySiMe_3 \quad (I)$$
$$|$$
$$PE$$

where PE=—$CH_2CH_2CH_2O(EO)_m(PO)_nZ$.

In the formula (I), Me represents methyl, EO represents ethyleneoxy, PO represents 1,2-propyleneoxy, Z is hydrogen or a lower alkyl group (for example, methyl, butyl, etc.); $x \geq 0$, $y > 0$, and m and n are, independently, positive numbers or zero, provided that m and n are not both zero. Compounds having formula (I) are alkyl pendant (AP)-type copolymers.

The branched compounds are branched polydimethysiloxanes to which polyethers have been attached through condensation chemistry; they have the following general formula (II):

$$(MeSi)y\text{-}2[(OSiMe_2)_{x/y}O\text{—}PE]_y \quad (II)$$

where PE=-$(EO)_m(PO)_nR$; Me, EO, m, n, and PO are as defined above; $y \geq 3$, and $x \geq y$; and R represents a lower alkyl group. Compounds having formula (II) are alkoxy-endblocked (AEB-type) copolymers.

Silwet® surfactants are available in a variety of molecular weights, EO/PPO ratios, end caps, Hydrophilic-Lipophilic Balance (HLB) values, and estimated % silicone levels. Nonlimiting examples are presented in Table 1. Molecular weight are weight-average ($M_w$).

TABLE 1

| Product Code | HLB | EO/PPO Ratio | End Cap (Z) | Molecular Weight | Est. % Silicone |
|---|---|---|---|---|---|
| L-7001 | Medium | 40/60 | Methyl | 20,000 | 26.5 |
| L-7002 | Medium | 50/50 | Butyl | 8,000 | 24.5 |
| L-7087 | Medium | 40/60 | Methyl | 20,000 | N/A |
| L-7200 | High | 75/25 | Hydrogen | 19,000 | 27 |
| L-7210 | Low | 20/80 | Hydrogen | 13,000 | 12.5 |
| L-7220 | Low | 20/80 | Hydrogen | 17,000 | 24.5 |
| L-7230 | Medium | 40/60 | Hydrogen | 29,000 | 24 |
| L-7500 | Low | All PPO | Butyl | 3,000 | 25.5 |

Low HLB: 5 to 8
Medium HLB: 9 to 12
High HLB: 13 to 17

HLB values for Silwet® surfactants are estimated by the manufacturer from their aqueous solubility and cloud point, using the method described by W. C. Griffin, *Off Dig. Fed. Paint and Varnish Production Clubs,* 28, 446 (1956) and/or H. Schott, *J. Pharm. Science,* 58, 1442 (1969), both articles being incorporated herein by this reference.

Optimal results are obtained when the face side adhesive (FSA) is formulated with a high HLB (>12) polyalkylene oxide-modified organopolysiloxane having a weight average molecular weight greater than 6,000 or 7,000, and a % silicone level of at least 10%, more preferably about 25% by weight or higher. It is also preferred to employ the cutting aid in a positive amount up to about 7 parts by weight, more preferably about 2 to 7 parts by weight, per 100 parts of elastomers+tackifier(s). If too much cutting aid is employed, the adhesive formulation becomes more expensive, and difficult to process. In addition, loss of adhesiveness may result due to excess cutting aid migrating to the LSA. If too little cutting aid is employed, a sub-optimal improvement in cuttability results. Silwet® L7200, an AP-type copolymer having a high HLB value, is most preferred.

In another embodiment of the invention, the cutting aid is an ultrahigh molecular weight (UHMW) organopolysiloxane dispersed in polystyrene. A preferred example is Dow Corning "MB 50-004," a pelletized formulation containing 50% by weight of a UHMW organopolysiloxane (i.e., PDMS) dispersed in high-impact polystyrene. The organopolysiloxane has a number-average molecular weight in the range of about 500,000 and a plasticity of from 55 to 65. In one embodiment, the UHMW organopolysiloxane cutting aid is included in the formulation in a positive amount up to about 7 parts by weight per 100 parts of adhesive, e.g., per 100 parts of elastomers+tackifier(s); preferably from about 2 to 7 parts by weight; more preferably from about 3 to 5 parts by weight.

Other components can be added to the formulation of one or more of the adhesive layers to improve the stability of the adhesive, extend the formulation, impart structural reinforcement, improve repulpability, or impart some other desirable property. Nonlimiting examples of such additives include fillers, such as calcium carbonate and talc; antioxidants, which inhibit oxidative degradation of the adhesives; and pigments. Inorganic fillers like talc and calcium carbonate tend to improve cuttability of the construction, but decrease the cohesive strength of the adhesive if employed in high concentration.

In a preferred embodiment, a combination of Irganox and Irgafos antioxidants, available from the Ciba Additives Division of Ciba-Geigy Corp. (Terrytown, N.Y.), is used to stabilize the adhesive formulation. Particularly good stability is realized when a combination of Irganox 1010, Irganox 1076, and Irgafos 168 is used. Irganox 1010 is a "primary" antioxidant; Irganox 1076 alleviates potential loss of adhesive tack due to exposure to air or light; and Irgafos 168 is a "secondary" antioxidant, which acts as a radical scavenger and interacts synergistically with the primary antioxidant. In alternate embodiments, other antioxidants or antioxidant combinations can be employed.

The adhesive compositions used in the practice of the present invention are prepared in a conventional manner by blending together elastomers, tackifier(s), cutting aid(s), plasticizer(s), stabilizer(s), and other components in a mixer, (e.g., a Sigma-blade mixer, a twin-screw extruder, etc.) at elevated temperature, preferably in an inert atmosphere. The processing technique may affect the morphology and rheometrics of the resulting composition. For example, multi-gram quantities of a two-elastomer formulation compounded by an extruder mixer, having a residence time of about one minute, produced a well-mixed melt that gave two $T_g$ peaks in a DMS. When the same formulation was mixed in a sigma mixer with a residence time of about 30 minutes, more shearing forces were encountered, and the resulting DMS revealed a less pronounced $T_{g1}$ and a $T_{g2}$ shifted toward a lower temperature.

In general, the adhesive formulations for the LSA layer 18 are selected to provide high PSA performance (peel, shear, and/or tack). The adhesive formulations for the FSA layer 16 are selected to enhance the convertibility of the resulting multilayer construction and, therefore, tend to be brittle and crack under action of a die or other cutting surface at the cutting frequency, rather than smear and conform to the cutting surface. At a ratio of butadiene-based elastomers to isoprene-based elastomers of about 0.5:1 or higher, two transition temperature peaks are initially observed and the tangent 6 is high, indicating a high amount of energy loss in cutting any PSA with this elastomeric formulation (described below). At higher ratios of butadiene to isoprene segments, in which the mixture of immiscible elastomers contains a discontinuous isoprene-based phase, which serves as a reservoir for tackifiers that are preferentially soluble in the isoprene-based phase, the mixture exhibits two glass transition temperature peaks and lower tangent delta values. A lower overall energy is required to cut such a formulation.

The multilayer adhesive constructions of the present invention can be manufactured using a variety of methods well known to those skilled in the art of adhesive coating. Two or more layers can be applied to an appropriate substrate by, for example, separately coating each layer out of solvent or emulsion, or applying each layer as a hot melt; drying the coated substrates or coatings separately; and then laminating the coated layers together to form an integral product. Alternatively, two adhesive layers can be essentially simultaneously coated on or otherwise applied to a facestock or release liner.

Nonlimiting examples of conventional coating methods include die, slot die, slide, multilayer die, die/slide combination, air knife, brush, curtain, extrusion, blade, floating knife, gravure, kiss roll, knife-over-blanket, knife-over-roll, offset gravure, reverse roll, reverse smoothing roll, rod, and squeeze roll coating. A preferred method of manufacture uses a multilayer die and is described in U.S. Pat. No. 5,728,430 (assigned to Avery Dennison Corp.), which is incorporated herein by reference. The adhesive composition can be coated on a release liner (e.g., a silicone-coated paper or film), air-or oven-dried, and then laminated to a backing, i.e., a facestock. Alternatively, the adhesive can be coated directly on a facestock, dried, and then protected with a release liner. Self-wound tapes also can be prepared, e.g., by coating the adhesive on one side of a tape facestock. (The other side of the facestock is silicone-coated or otherwise treated so the tape can be wound up on itself without blocking.)

In general, the adhesive layers 16 and 18 are provided in a combined weight per unit area (i.e., coat weight) of from about 4 to 200 grams per square meter ($g/m^2$), preferably from about 4 to 100 $g/m^2$. The coat weight of each individual layer will generally be within the range of from about 2 to 50 $g/m^2$. Coat weights for each individual layer may be as large as about 100 $g/m^2$. The presently preferred coat weights of individual layers in label constructions range from about 2 to 35 $g/M^2$, more preferably about 2 to 15 $g/m^2$. Depending on the intended application, degree of guillotinability required, and other factors, the FSA and LSA layers may have the same or unequal thicknesses.

In some embodiments, it can be advantage to cure one or more adhesive layers, either by heating the layer(s) or, more preferably, by irradiating the layer(s) with UV light, electron-beam (EB) radiation, or other actinic radiation. Thermal cure can be hastened with a chemical crosslinking agent. UV and EB curing can be carried out in a manner well known to those skilled in the art, using commercially available equipment. Thus, UV-induced cure can be facilitated with, e.g., mercury lamps, fusion system lamps, and the like. A variety of bulbs, including D, Q, V, and H bulbs, are available, with spectral outputs covering a range of ultraviolet wavelengths. For example, a "D" bulb emits UV radiation within a spectral region of from 200 nm to 450 nm, with a relatively stronger emission in the region of 350 to 450 nm. In some embodiments, it is preferred to cure one or more layers of adhesive prior to lamination to the other layer(s). Cured adhesive constructions are useful in, e.g., industrial applications where the facestock is a plastic film, the finished product will be applied to a substrate by hand (rather than by high-speed labeling machinery), and there is less of a concern about loss of tackiness resulting from adhesive cure.

Figure 4:
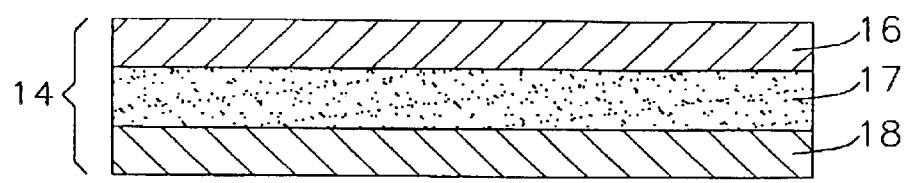
FIG. 4 is a schematic, cross-sectional illustration of one embodiment of a three-layer adhesive laminate.

FIG. 4 illustrates an alternate embodiment of the invention in-which the adhesive laminate 14 is formed of three adhesive layers: A FSA layer 16, an intermediate adhesive layer 17, and a LSA layer 18. At least the LSA is a functional PSA selected for its adhesive performance on various substrates under various conditions (e.g., low, room, and elevated temperature, high humidity, etc.). Either or both of the FSA layer 16 and the intermediate adhesive layer 17 are compounded with a cutting aid as described herein. The adhesive compositions selected for each of the three layers can be varied to meet desired performance characteristics, to provide lower cost constructions, to insure compatibility between the layers, adhesion to the facestock, etc. The FSA layer 16 can, for example, comprise a tackified blend of elastomers, as described above. Alternatively, an acrylic adhesive can be used. Similarly, the intermediate layer 17 and the LSA layer 18, independently, can be rubber-based or acrylic-based adhesives. One or more fillers, plasticizers, antioxidants, or other additives may be added to one or more of the adhesive layers, as desired.

In a particularly preferred 3-layer adhesive laminate 14, the FSA and LSA layers are functional PSAs identical in composition, each comprising a tackified blend of butadiene-based and isoprene-based elastomers blended together at a weight ratio of butadiene-based elastomers to isoprene-based elastomers of about 1:1.5, with the elastomers comprising at least 45% by weight of the combined weight of the elastomers and tackifier(s). The higher rubber content is particularly beneficial where the facestock is a plastic material (e.g., polyolefin, polyester, polyvinyl chloride, etc.), and helps limit migration of tackifiers and other low molecular weight species into the facestock. In this preferred embodiment, the intermediate layer 17 is also a tackified blend of butadiene-based and isoprene-based elastomers, but with a butadiene-based elastomer to isoprene-based elastomer weight ratio of about 1.5:1. In addition, the intermediate layer 17 is compounded with about 2–7 parts by weight of a siloxane-type cutting aid as described above per 100 parts elastomers+tackifier(s). Because the intermediate layer differs from the FSA and LSA (which are identical), the structure of the adhesive laminate 14 is ABA in nature.

It will be appreciated that an alternate embodiment of a 3-layer adhesive laminate can be formed, with an ABC structure; that is, the FSA, intermediate adhesive layer, and LSA are each distinct from one another. For example, the FSA can be a first acrylic-based or rubber-based adhesive; the intermediate adhesive can be a second acrylic-based or rubber-based adhesive, which is compounded with a cutting aid; and the LSA can be a third acrylic-based or rubber-based adhesive. Preferably, at least the LSA is a functional PSA. Nonlimiting examples of rubber-based adhesives are provided above. A plethora of acrylic PSAs are known; non-limiting examples are described in U.S. Pat. Nos. 5,164, 444, 5,252,662, and 5,817,426, each of which is incorporated by reference herein.

EXAMPLES

Single-layer and multilayer adhesive constructions were prepared and evaluated for converting performance (press speed and die-cut energy) and adhesive performance (peel adhesion and loop tack). In each case, a liner side adhesive (LSA) was prepared by blending together two elastomers (SIS and SB copolymers), tackifiers, a filler, and antioxidants, in a Leistritz twin-screw extruder. A single-layer adhesive construction was made by coating the LSA formulation onto a silicone-coated paper release liner (40# opaque C25-MSC super-calendared Kraft, from United Paper Mills); Dow Corning Solventless silicone), at 10±0.5 grams per square meter ($g/m^2$) (dry weight), and laminating it to a paper facestock (40# semigloss paper from Consolidated Paper Co.).

To make the multilayer adhesive constructions, a set of face side adhesives (FSAs) was similarly prepared in a Leistritz twin-screw extruder, and a LSA/FSA adhesive laminate was made by dual die-coating a pair of adhesives (LSA+FSA) onto a release liner (identical to the one used to form the single-layer adhesive construction), and laminating the subconstruction thus formed to a semigloss paper (40# semigloss paper). The LSA layer was the same in each case, and was applied at 10±0.5 $g/m^2$. The FSA was also applied at 10±0.5 $g/m^2$. Table 2 summarizes the components used to prepare the single-layer (LSA only) and multilayer (LSA+FSA) constructions. Component amounts are express on a parts-by-weight basis. Entries in the "multilayer" columns are for the FSA layer.

To assess the converting characteristics of PSA constructions of the present invention, a series of converting trials were performed. The single layer construction and Examples 1 and 2 were converted through a Mark Andy Model 4120 press, (maximum press speed: 1000 ft./min.) using an X-die (4 labels across, 15/16" label width, 3.42" label length, 3/32" radius rounded label corner, with a 1/16" cross direction matrix, and 7/64" machine direction matrix) and a V-die (1 label across, 15/16" width, 14" label length, 3/32" radius rounded label corner, 1/16" cross direction matrix, and ½" machine direction matrix). The single layer construction and each of Examples 2 and 3, Comparative Example 1, and the Control were converted through a 10 Inch Comco Command Press (maximum press speed: 500 ft./min.), using a P-die (3 labels across, 15/16" label width, 2 15/16 label length, 3/31" radius rounded label corner, 1/16" cross direction matrix, and ⅛" machine direction matrix). After each die-cutting operation, the matrix surrounding the label was peeled away to leave rows of labels adhered to the release liner.

The efficacy of the converting process was monitored by the press operator, who observed the die-cutting and matrix stripping operations. The existence of "hangers," a term used to describe an adverse converting condition where pieces of the matrix are left on the release liner, was noted as a function of the press speed. Faster press speeds and an absence of hangers is indicative of a construction that converts better.

Results of the converting tests are presented in Table 3, which also provides die-cut friction energy data and adhesive performance data. Aged and unaged adhesive constructions were evaluated for low temperature (0° C.) peel adhesion to cardboard, and room temperature (23° C.) and low temperature (0° C.) loop tack adhesion to high density

TABLE 2

Single Layer and Multilayer Constructions

| Components (parts by wt.) | Single Layer | Multilayer | | | | |
|---|---|---|---|---|---|---|
| | | Ex. 1 | Ex. 2 | Ex. 3 | Comp. Ex. 1 | Control |
| Elastomers | | | | | | |
| SIS | 19.1 | 13.0 | 11.0 | 13.0 | 13.0 | 10.2 |
| SB | 16.4 | 22.5 | 19.0 | 22.5 | 22.5 | 17.8 |
| Tackifiers | | | | | | |
| Escorez 2596 | 9.0 | 9.0 | 9.0 | 9.0 | 9.0 | 9.0 |
| Hercotac 2010 | 55.5 | 55.0 | 61.0 | 55.5 | 55.5 | 63.0 |
| Cutting Agents | | | | | | |
| DC MB 50-004[1] | | | | 5.0 | | |
| Silwet L-7200[2] | | 5.0 | 3.0 | | | |
| Si Oil (1000 cst)[3] | | | | | 3.0 | |
| Fillers | | | | | | |
| $CaCO_3$ | 6.44 | | | | | |
| Talc | | 6.0 | 10.0 | 6.0 | 6.0 | 6.0 |
| Antioxidants | | | | | | |
| Irganox 1010 | 0.25 | 0.25 | 0.25 | 0.25 | 0.25 | 0.25 |
| Irganox 1076 | 0.25 | 0.25 | 0.25 | 0.25 | 0.25 | 0.25 |
| Irgafos 168 | 0.25 | 0.25 | 0.25 | 0.25 | 0.25 | 0.25 |
| Total | 107.19 | 111.75 | 113.75 | 111.75 | 109.75 | 106.75 |

Notes:
[1]DC MB 50-004 is a pelletized formulation containing 50% by weight of an ultra-high molecular weight (UHMW) siloxane dispersed in high-impact polystyrene available from Dow Corning.
[2]Silwet ®L-7200 is a preferred polyalkylene oxide-modified organopolysiloxane, from Witco Corp.
[3]Si Oil (1000 cst) is a low molecular weight silicone fluid (PDMS), available from Dow Corning.

polyethylene (HDPE). Accelerated aging tests were carried out by placing samples of adhesive constructions (face stock/adhesive layer(s)/release liner) in an oven maintained at 50° C., for one week. All adhesive construction samples were allowed to equilibrate with test room conditions (temperature and humidity) pursuant to standard TAPPI test protocols.

90° Peel Adhesion

Adhesive constructions were die-cut into 25×204 mm (1×8 in) sized strips. The strips were then applied centered on the lengthwise direction to 50×152 mm (2×6 in) cardboard test panels and rolled down using a 2 kg (4.5 lb), 5.45 pli 65 shore "A" rubber-faced roller, rolling back and forth once, at a rate of 30 cm/min (12 in/min). The samples were allowed to dwell on the test panels in a controlled environment test room maintained at either 23° C. (73° F.) and 50% relative humidity, or 0° C. (32° F.), for 15 min. After conditioning, the test strips were peeled away from the test panel using an Instron Universal Tester (Canton, Mass.) according to a modified version of the standard tape method Pressure Sensitive Tape Council, PSTC-1 (rev. 1992), Peel Adhesion For Single Coated Tapes 180° Angle, but using a 90° peel angle, i.e., perpendicular to the surface of the panel, at a rate of 30 cm/min (12 in/min). The force to remove the adhesive test strip from the test panel was measured in N/m. All tests were conducted in triplicate.

Loop Tack

Loop tack measurements were made for samples cut to 25×204 mm (1×8 in) size strips using high density polyethylene (HDPE) test panels, at a withdrawal rate of about 30.5 mm/min (12 in/min), according to standard tests 1994 TLMI Test L-1132, TLMI Loop Tack Test, by the Tag and Label Manufacturers Institute Inc. (TLMI), using an Instron Universal Tester, test model 4501. Loop Tack values were taken to be the highest measured adhesion value observed during the test, expressed in units of N/m. All tests were conducted in triplicate.

Die-Cut Friction Energy

Die-Cut Friction Energy was measured by die-cutting a laminate of face stock/adhesive layer(s)/release liner in a rotary die-cutting machine, cutting through the face stock and adhesive(s) but not the liner, and peeling the matrix away from the release liner, using the method described in U.S. Pat. No. 5,961,766 (Chang et al.), which is assigned to Avery Dennison Corporation and incorporated by reference herein. The separation speed was 5 mm/s. Die-cut friction energy data is presented in Table 3, with energy expressed in gram·seconds (gs).

TABLE 3

| | Single Layer (LSA) | Multilayer (FSA + LSA) | | | | |
|---|---|---|---|---|---|---|
| | | Ex. 1 | Ex. 2 | Ex. 3 | Comp. Ex. 1 | Control |
| Cutting Aid | None | L-7200 (5 pbw) | L-7200 (3 pbw) | 50-004 (5 pbw) | Si Oil (3 pbw) | None |
| Mark Andy Press[1] | | | | | | |
| Speed (ft./min.) | | | | | | |
| X-die | 780 | 900 | | | | |
| V-die | 50 | 50 | 150 | | | |
| Comco Press[2] | | | | | | |
| Speed (ft./min.) | | | | | | |
| P-die | 100 | 450 | 240 | 350 | 150 | 200 |
| Die-cut Friction Energy (gs) | 265+/−10 | 152+/−10 | 180+/−6 | 144+/−14 | 175+/−20 | 184+/−8 |
| Loop Tack (N/m) | | | | | | |
| 0° C., HDPE (initial) | 0.3+/−0.1 | 1.5+/−0.4 | 0.2+/−0.02 | 1.2+/−0.5 | 0.5+/−0.2 | 0.1+/−0.05 |
| 0° C., HDPE (aged) | 0.3+/−0.1 | 2.0+/−1.0 | 0.3+/−0.1 | 0.3+/−0.1 | 1.8+/−0.8 | 0.3+/−0.1 |
| 23° C., HDPE (initial) | 13.5+/−0.8 | 17.0+/−0.4 | 18.5+/−0.5 | 15.7+/−0.1 | 17.0+/−0.3 | 21.0+/−0.7 |
| 23° C., HDPE (aged) | 13.2+/−0.4 | 17.3+/−0.7 | 15.3+/−1.1 | 15.3+/−0.7 | 16.0+/−1.6 | 15.0+/−1.0 |
| 90° Peel (N/m) | | | | | | |
| 0° C., Cardboard (initial) | 4.5+/−0.3 | 4.0+/−0.1 | 3.6+/−0.3 | 3.7+/−0.2 | 3.3+/−0.1 | 3.2+/−0.2 |
| 0° C., Cardboard (aged) | 2.4+/−0.4 | 3.3+/−0.2 | 2.7+/−0.6 | 4.6+/−0.5 | 2.4+/−0.2 | 1.9+/−0.1 |

[1]Max. Press Speed: 1,000 ft./min. (theoretical)
[2]Max. Press Speed: 500 ft./min (theoretical)

The invention has been described in terms of preferred and exemplary embodiments, but is not limited thereto. Modifications, improvements, and variations can be made by the skilled worker without departing from the invention, which is limited only by the appended claims. For example, higher-order adhesive laminates (>3 adhesive layers) can be employed in the construction. As another example, miscible blends of elastomers can be substituted for the immiscible blends of elastomers described herein. Indeed, a wide variety of rubber-based and acrylic-based adhesives can be substituted for those particularly described herein. In another modification, one or more layers of adhesives can be thermally cured, or cured with electron beam (EB) or other actinic radiation, in order to impart a degree of crosslinking to the adhesive. Especially useful is post-coating, pre-lamination EB curing, particularly where plastic facestocks are employed in the construction. Thermal and radiation curing processes are well known in the art. Non-limiting examples are described in U.S. Pat. Nos. 4,820,746, 5,232, 958, 5,011,867 and 5,093,406, the contents of which are incorporated by reference herein.

Throughout the text and the claims, use of the word "about" in relation to a range of numbers is intended to modify both the high and the low values recited.

What is claimed is:

1. An adhesive construction, comprising:
   (a) a facestock having first and second surfaces;
   (b) an adhesive laminate in contact with the first surface of the facestock, said adhesive laminate comprising two or more adhesive layers, including (i) at least one adhesive layer compounded with a cutting aid selected from the group consisting of polyalkylene oxide-modified organopolysiloxanes and ultrahigh molecular weight organopolysiloxanes dispersed in polystyrene, adjacent to (ii) at least one other adhesive layer.

2. An adhesive construction as recited in claim 1, wherein the cutting aid is a polyalkylene oxide-modified organopolysiloxane having a formula

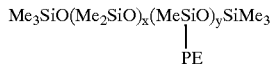

wherein PE is —$CH_2CH_2CH_2O(EO)_m(PO)_nZ$, wherein Me represents methyl, EO represents ethyleneoxy, PO represents 1,2-propyleneoxy, Z is hydrogen or lower alkyl, $x \geq 0$, $y > 0$, and m and n are, independently, positive numbers or zero, provided that m and n are not both zero.

3. An adhesive construction as recited in claim 2, wherein the polyalkylene oxide-modified organopolysiloxane has a weight-average molecular weight of about 6,000 or more.

4. An adhesive construction as recited in claim 2, wherein the polyalkylene oxide-modified organopolysiloxane has an EO/PO ratio of about 75/25.

5. An adhesive construction as recited in claim 2, wherein Z is methyl or butyl.

6. An adhesive construction as recited in claim 2, wherein the polyalkylene oxide-modified organopolysiloxane has a hydrophilic-lipophilic balance greater than about 12.

7. An adhesive construction as recited in claim 1, wherein the cutting aid is a polyalkylene oxide-modified organopolysiloxane having a formula
   where PE is —$(EO)_m(PO)_nR$, wherein Me represents methyl, EO represents ethyleneoxy, Pa represents 1,2-propyleneoxy, R represents lower alkyl, $y \geq 3$, $x \geq y$, and m and n are, independently, positive numbers or zero, provided that m and n are not both zero.

8. An adhesive construction as recited in claim 1, wherein the cutting aid is an ultrahigh molecular weight organopolysiloxane dispersed in polystyrene.

9. An adhesive construction as recited in claim 1, wherein the adhesive laminate comprises a face side adhesive (FSA), which is compounded with the cutting aid, and a liner side adhesive (LSA) which is a pressure-sensitive adhesive.

10. An adhesive construction as recited in claim 9, wherein the FSA comprises a tackified blend of elastomers.

11. An adhesive construction as recited in claim 10, wherein the blend of elastomers comprises at least one butadiene-based polymer and at least one isoprene-based polymer.

12. An adhesive construction as recited in claim 11, wherein said at least one butadiene-based polymer is selected from the group consisting of SBS block copolymers, SB block copolymers, multiarmed $(SB)_x$ block copolymers, polybutadiene, and mixtures thereof.

13. An adhesive construction as recited in claim 11, wherein said at least one isoprene-based polymer is selected from the group consisting of SIS block copolymers, SI block copolymers, multiarmed $(SI)_x$ block copolymers, radial block copolymers having an SEBS backbone and I and/or SI arms, natural rubber, synthetic polyisoprene, and mixtures thereof.

14. An adhesive construction as recited in claim 10, wherein the blend of elastomers is tackified with at least one tackifier that is preferentially soluble in said at least one isoprene-based polymer.

15. An adhesive construction as recited in claim 10, wherein the cutting aid is a polyalkylene oxide-modified organopolysiloxane present in an amount of about 2 to 7 parts by weight per 100 parts by weight of tackified elastomers.

16. An adhesive construction as recited in claim 10, wherein the cutting aid is a polyalkylene oxide-modified organopolysiloxane present in an amount of about 3 to 5 parts by weight per 100 parts by weight of tackified elastomers.

17. An adhesive construction as recited in claim 9, wherein the FSA comprises an acrylic PSA.

18. An adhesive construction as recited in claim 9, wherein the LSA comprises a tackified blend of elastomers.

19. An adhesive construction as recited in claim 9, wherein the LSA comprises an acrylic PSA.

20. An adhesive construction as recited in claim 9, wherein the FSA and the LSA each comprise, independently, a tackified blend of elastomers.

21. An adhesive construction as recited in claim 1, wherein the adhesive laminate is protected with a removable release liner.

22. An adhesive construction as recited in claim 1, further comprising a release coating on the second surface of the facestock.

23. An adhesive construction as recited in claim 1, wherein the adhesive laminate comprises a face side adhesive (FSA), an intermediate adhesive layer adjacent to the FSA, and a liner side adhesive (LSA) adjacent to the intermediate adhesive layer; wherein the FSA and/or the intermediate adhesive layer is compounded with the cutting aid; and wherein at least the LSA is a PSA.

24. An adhesive construction, comprising:
    (a) a facestock having first and second surfaces;
    (b) an adhesive laminate in contact with the first surface of the facestock, said adhesive laminate comprising (i) a face side adhesive (FSA) layer compounded with a polyalkylene oxide-modified organopolysiloxane, said FSA comprising a first tackified blend of elastomers, adjacent to a liner side adhesive (LSA) layer, said LSA comprising a second tackified blend of elastomers.

25. An adhesive construction, comprising:
    (a) a facestock having first and second surfaces;
    (b) an adhesive laminate in contact with the first surface of the facestock, said adhesive laminate comprising (i) a face side adhesive (FSA) layer compounded with an ultrahigh molecular weight organopolysiloxane dispersed in polystyrene, said FSA comprising a first tackified blend of elastomers, and (ii) a liner side adhesive (LSA) layer, said LSA comprising a second tackified blend of elastomers.

26. A method for making an adhesive construction, comprising:
    simultaneously coating on a facestock a face side adhesive (FSA) and a liner side adhesive (LSA) adjacent thereto, said FSA comprising an adhesive compounded with a cutting aid selected from the group consisting of polyalkylene oxide-modified organopolysiloxanes and ultrahigh molecular weight organopolysiloxanes dispersed in polystyrene.

27. A method as recited in claim 26, wherein the LSA is a PSA.

28. A method for making an adhesive construction, comprising:

forming an adhesive-coated release liner by simultaneously coating on a release liner a liner side adhesive (LSA) and a face side adhesive adjacent thereto, said FSA comprising an adhesive compounded with a cutting aid selected from the group consisting of polyalkylene oxide-modified organopolysiloxanes and ultrahigh molecular weight organopolysiloxanes dispersed in polystyrene; and laminating the adhesive-coated release liner to a facestock.

* * * * *

UNITED STATES PATENT AND TRADEMARK OFFICE
CERTIFICATE OF CORRECTION

PATENT NO. : 6,841,257 B2  Page 1 of 1
APPLICATION NO. : 10/463829
DATED : January 11, 2005
INVENTOR(S) : Sasaki et al.

It is certified that error appears in the above-identified patent and that said Letters Patent is hereby corrected as shown below:

In the Claims

Column 17, line 22, Claim 2  Delete "$x \geqq 0$",
Insert --$x \geq 0$--

Column 17, line 38, Claim 7  After "having a formula",
Insert
--$(MeSi)_{y-2}[(OSiMe_2)_{x/y}O - PE]_y$--

Column 17, line 40, Claim 7  Delete "Pa",
Insert --PO--

Column 17, line 41, Claim 7  Delete "$y \geqq 3, x \geqq y$",
Insert --$y \geq 3, x \geq y$--

Column 18, line 44, Claim 24  After "adjacent to",
Insert --(ii)--

Signed and Sealed this

Fifteenth Day of January, 2008

JON W. DUDAS
*Director of the United States Patent and Trademark Office*